(54) MEMBRANE SEPARATION OF COMPONENTS IN A FLUID MIXTURE

(75) Inventors: James D. Way, Boulder, CO (US); Anawat Sungpet, Bangkok (TH)

(73) Assignee: Colorado School of Mines, Golden, CO (US)

( * ) Notice: Under 35 U.S.C. 154(b), the term of this patent shall be extended for 0 days.

(21) Appl. No.: 09/180,964

(22) PCT Filed: May 15, 1997

(86) PCT No.: PCT/US97/08377

§ 371 Date: May 24, 1999

§ 102(e) Date: May 24, 1999

(87) PCT Pub. No.: WO97/44121

PCT Pub. Date: Nov. 27, 1997

Related U.S. Application Data

(60) Provisional application No. 60/017,818, filed on May 17, 1996.

(51) Int. Cl.$^7$ .................................................... B01D 61/36
(52) U.S. Cl. ...................... 210/640; 210/651; 210/653; 95/45; 95/50
(58) Field of Search ............... 210/640, 500.27, 210/651, 653, 650; 95/45, 50

(56) References Cited

U.S. PATENT DOCUMENTS

| | | | |
|---|---|---|---|
| 3,773,844 | * 11/1973 | Perry et al. | 95/50 |
| 4,318,714 | * 3/1982 | Kimura et al. | 210/638 |
| 4,976,860 | 12/1990 | Takahashi et al. | 210/500.28 |
| 5,015,268 | 5/1991 | Ho | 55/16 |
| 5,062,866 | 11/1991 | Ho | 55/16 |
| 5,135,547 | 8/1992 | Tsou et al. | 55/16 |
| 5,152,899 | 10/1992 | Berger et al. | 210/644 |
| 5,187,034 | 2/1993 | Otagawa et al. | 429/198 |
| 5,264,123 | 11/1993 | Bailey | 210/321.75 |
| 5,334,292 | 8/1994 | Rajeshwar et al. | 204/59 |
| 5,414,194 | 5/1995 | Dubois et al. | 585/855 |
| 5,498,339 | 3/1996 | Creusen et al. | 210/644 |

OTHER PUBLICATIONS

Aldebert, Pierre et al., "New Chemical Synthesis of Mixed Conductivity Polymers," J. Chem. Soc., Chem. Commun., 1986, pp. 1636–1638.

Fan, Fu–Ren F. and Allen J. Bard, "Polymer Films on Electrodes," J. Electrochem. Soc., vol. 133, No. 2, Feb. 1986, pp. 301–304.

Gottschlich, Douglas E. and Daryl L. Roberts, "Energy Minimization of Separation Processes Using Conventional/Membrane Hybrid Systems," Energy Conservation, Final Report to U.S. Dept. of Energy, Sep. 28, 1990, pp. II–8 through II–9, and IV–1 through IV–29.

Iyoda, Tomokazu et al., "Diaphragmatic Chemical Polymerization of Pyrrole in the Nafion Film," Macromolecules, vol. 23, No. 7, 1990, pp. 1971–1976.

(List continued on next page.)

Primary Examiner—Ana Fortuna
(74) Attorney, Agent, or Firm—Holme, Roberts & Owen, LLP

(57) ABSTRACT

Provided is a membrane separation method for separating a first component (106) from a second component (108) in a fluid mixture (102). The method is particularly useful for separating a more highly unsaturated organic compound from a less highly unsaturated organic compound of a saturated organic compound, as well as making other separations. A membrane is used that includes first chemical groups, that are ionic and associated with ion exchange sites in the membrane, a second chemical group that modify the electronic environment of the ion exchange sites to enhance facilitated transport through the membrane. An example membrane is a silver (I)-form Nafion™-poly(pyrrole) composite membrane. Also provided are a membrane (112), and apparatus (110) for use with the method.

25 Claims, 6 Drawing Sheets

OTHER PUBLICATIONS

Koval, Carl A. et al., "Facilitated Transport of Unsaturated Hydrocarbons in Perfluorosulfonic Acid (Nafion) Membranes," Chemical Separations with Liquid Membranes, Bartsch and Way eds., ACS Symposium Series 642, 1996, pp. 288–302.

Nagasubramanian, G. et al., "Electrochemical Incorporation of Poly(pyrrole) Into Nafion and Comparison of the Electrochemical Properties of Nafion–Poly(pyrrole) and Poly(pyrrole) Films," The Journal of Physical Chemistry, vol. 90, No. 18, 1986, pp. 4447–4451.

Schwitzgebel, Gunter and Frank Endres, "The Determination of the apparent diffusion coefficient of HCl in Nafion–117 and polypyrrole +Nafion–117 by simple potential measurements," Journal of Electroanalytical Chemistry 386 (1995) pp. 11–16.

* cited by examiner

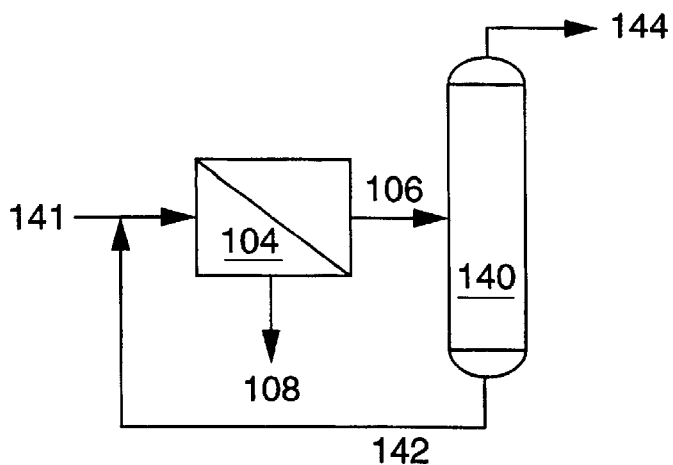
Fig. 5
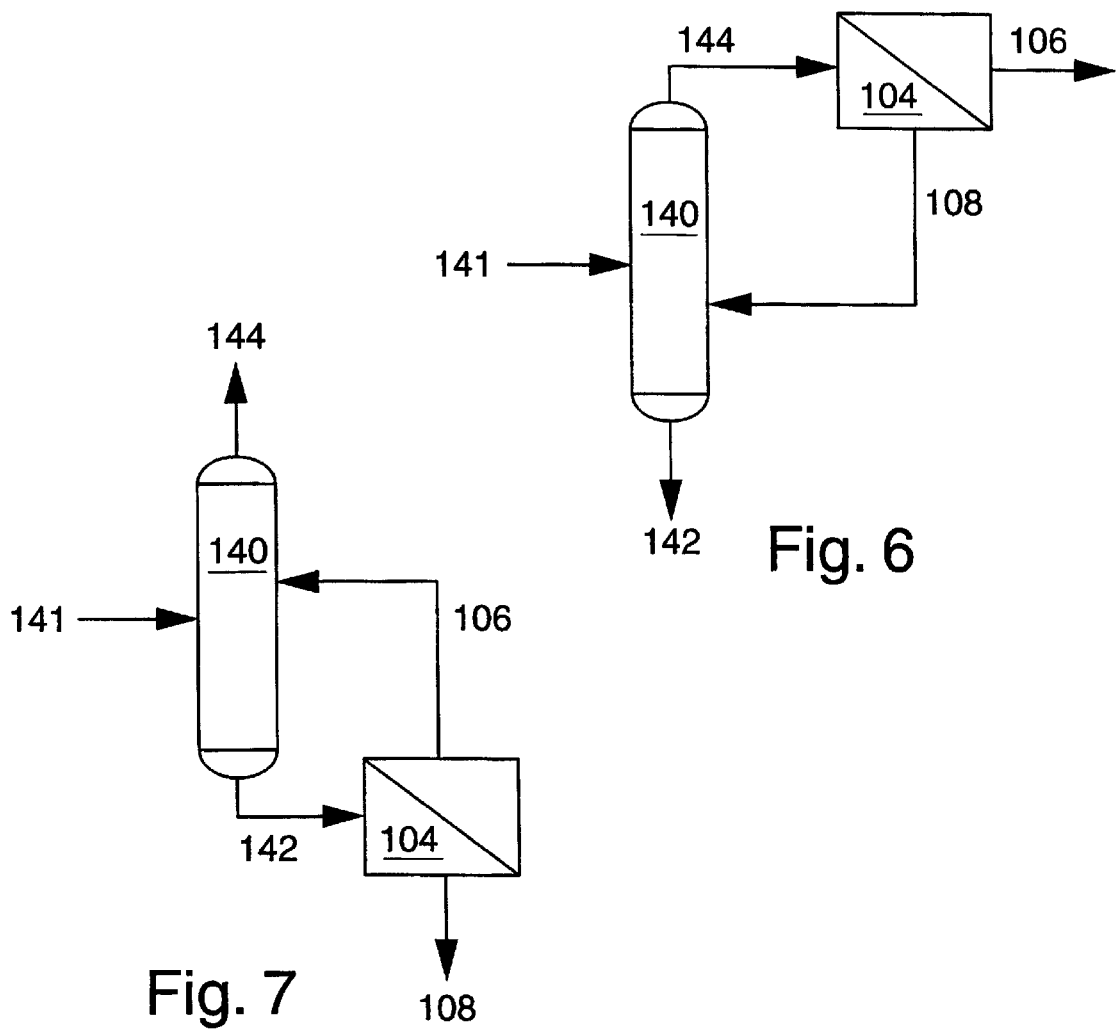
Fig. 6
Fig. 7

MEMBRANE SEPARATION OF COMPONENTS IN A FLUID MIXTURE

This application claims the benefit of U.S. Provisional Application No. 60/017,818, filed on May 17, 1996, and is a 371 of PCT/US97/08377, filed on May 15, 1997.

FIELD OF THE INVENTION

The present invention involves membrane separation of components in a fluid mixture, and is particularly well suited for separation of a more highly unsaturated organic compound from a less highly unsaturated organic compound or a saturated organic compound. Example separations include alkenes from alkanes, alkynes from alkenes and alkanes, dialkenes from monoalkenes, and styrene monomer from ethyl benzene.

BACKGROUND OF THE INVENTION

Many chemical manufacture and refining processes involve a difficult separation of a desired product compound from a fluid mixture containing one or more other compounds having physical properties in close proximity to those of the product compound. Examples of such difficult separations include separation of alkenes, such as ethylene or propylene, from the corresponding alkane, such as ethane or propane, and separation of styrene monomer from ethyl benzene. Currently, these difficult separations are typically performed by distillation. Distillation separation of such compounds, however, requires tall distillation towers and extensive heating to make a satisfactory separation, due to the close proximity of boiling points of the compounds being separated.

These difficult distillation separations consume a significant quantity of energy. For example, separation of alkenes from alkanes by distillation has been estimated to consume 0.12 quad per year of energy (1 quad equals one trillion billion BTU). This large energy consumption is largely due to distillation of the light olefins ethylene and propylene, which are two of the largest volume chemicals produced worldwide.

One method that has been proposed for separating olefins in a manner to avoid the high energy consumption of distillation is to make the separation with a facilitated transport membrane. A facilitated transport membrane is a thin film membrane that includes a carrier specie in the membrane that preferentially chemically interacts with a desired component to facilitate transport of that component across the membrane, thereby separating the desired component from an undesired component. In that regard, it is known that many alkenes undergo complexation reactions with silver(I) cations and that alkanes typically do not. Therefore, facilitated transport membranes including a silver (I) cationic carrier have been extensively researched at a laboratory scale with some success. Despite such extensive research, however, the use of facilitated transport membranes has not found industrial acceptance for olefin separation applications. This failure to gain industrial acceptance is largely due to problems associated with membrane and carrier stability in industrial settings.

For example, one class of membranes that have been proposed for alkene/alkane separations are the so-called immobilized liquid membranes. Immobilized liquid membranes involve a thin liquid film containing the ionic carrier. A major problem with the use of immobilized liquid membranes in industrial applications is that it is difficult to keep the liquid immobile and to keep the liquid of the membrane from evaporating. Another class of membranes that has been proposed are ion exchange membranes. With ion exchange membranes, the ionic carriers are contained within a polymeric material. A major problem with ion exchange membranes, however, is that they have been ineffective as transport membranes for alkenes unless the polymeric material is swollen with water. To address this problem, it is generally required to saturate the feed and permeate streams with water to prevent drying of the swollen membrane. Although such a procedure works well on a laboratory scale, it is impractical for most industrial applications. Immobilized liquid membranes and water-swollen ion exchange membranes, therefore, both suffer from a need to prevent liquid losses from the membranes during operation.

There is a significant need for improved membrane separation techniques to address the foregoing problems.

SUMMARY OF THE INVENTION

The present invention provides a membrane separation method in which a facilitated transport membrane is used to separate from a fluid mixture a variety of components, and particularly unsaturated organic compounds such as alkenes, alkynes, styrene monomer, etc. The membrane separation method uses a facilitated transport membrane that does not require the presence of water or other solvent during operation. The membrane includes a polymeric matrix having a chemical group that interacts with ion exchange sites in the polymer matrix to modify the electronic environment of the ion exchange sites to permit facilitated membrane transport of unsaturated organic compounds in the absence of water. It is believed that the presence of water in the water-swollen ion exchange membranes of the prior art affects the electronic environment of ion exchange sites in a manner to permit the ionic carrier of the membrane to participate in a complexation reaction with an unsaturated organic compound. Inclusion in the membrane of the present invention of a chemical group to modify the electronic environment of the ion exchange sites is believed to at least partially replace the beneficial effects that otherwise would be provided if water were present.

A preferred class of membrane materials for the present invention include two polymers. The first polymer is an ion exchange polymer similar to those that have been previously used in a water-swollen state for alkene separations. The second polymer includes the chemical group that modifies the electronic properties of ion exchange sites associated with the ion exchange polymer. The ion exchange polymer preferably includes anionic groups for cation exchange at the ion exchange sites and the second polymer includes positively charged groups that act at least partially as counter ions to the anionic groups of the first polymer, thereby modifying the electronic properties of the ion exchange sites. An example of a membrane used with present invention is one including a perfluorosulfonic acid polymer as the first polymer and oxidized poly(pyrrole) as the second polymer, with the ion exchange sites of the first polymer being occupied by an appropriate cationic carrier for the facilitated transport.

It is an object of the present invention to provide a membrane separation method for separating unsaturated organic compounds from fluid mixtures without requiring the presence of water during the separation.

It is another object of the present invention to provide a membrane for separation of unsaturated organic compounds from fluid mixtures without requiring the presence of water during the separation.

It is a further object of the present invention to provide an apparatus for use in membrane separation of unsaturated organic compounds from fluid mixtures.

It is a further object of the present invention to provide a method for manufacturing membranes useful in the separation of unsaturated organic compounds.

BRIEF DESCRIPTION OF THE DRAWINGS

FIG. 5 is a process block diagram of one embodiment of a hybrid separation process incorporating membrane separation and distillation according to the present invention.

FIG. 6 is a process block diagram showing another embodiment of a hybrid separation process incorporating membrane separation and distillation according to the present invention.

FIG. 7 is a process block diagram of a further embodiment of a hybrid separation process incorporating membrane separation and distillation according to the present invention.

DETAILED DESCRIPTION

In one aspect, the present invention involves a method of membrane separation of a first component in a fluid mixture from a second component in the fluid mixture. The membrane used in the process is characterized, in one respect, as including a polymer matrix with a plurality of a first chemical group, being an ionic group corresponding with ion exchange sites of the polymer matrix, and a plurality of a second chemical group that modifies the electronic environment of the ion exchange sites. The first chemical group typically is negatively charged, or anionic, and corresponds with ion exchange sites where cationic carriers may be loaded to facilitate transport of the first component across the membrane. The second chemical group is typically positively charged, or cationic, with the positive charge of the second chemical group modifying the electronic environment of the ion exchange sites. Not to be bound by theory but to aid understanding of the invention, it is believed that by incorporating a positively charged second chemical group into the polymer matrix, that cationic carriers associated with the ion exchange sites will not be as strongly bound in the ion exchange sites, with a result being that the cationic carriers are freer to complex with the first component to facilitate transport of the first component. It is believed that the positively charged second chemical group acts to some extent as a counter ion to the negatively charged first chemical group, reducing the electron donation bonding force between the negatively charged first chemical group and the cationic carrier.

Figure 1:
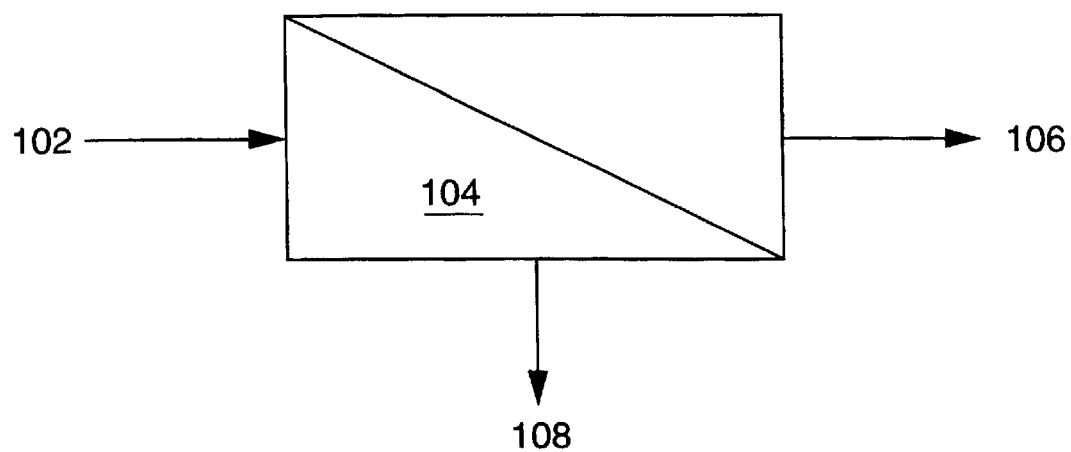
FIG. 1 is a process block diagram showing one embodiment of membrane separation of the present invention.

Referring now to FIG. 1, the general operation of the process of the present invention will be described. As shown in FIG. 1, a feed fluid 102 is subjected to a membrane separation step 104 in which the feed fluid 102 contacts a membrane. A portion of the feed fluid 102 passes through the membrane and exits the membrane separation step 104 as a permeate fluid 106. Another portion of the feed fluid 102 does not pass through the membrane and exits the membrane separation step 104 as a retentate fluid 108.

Figure 2:
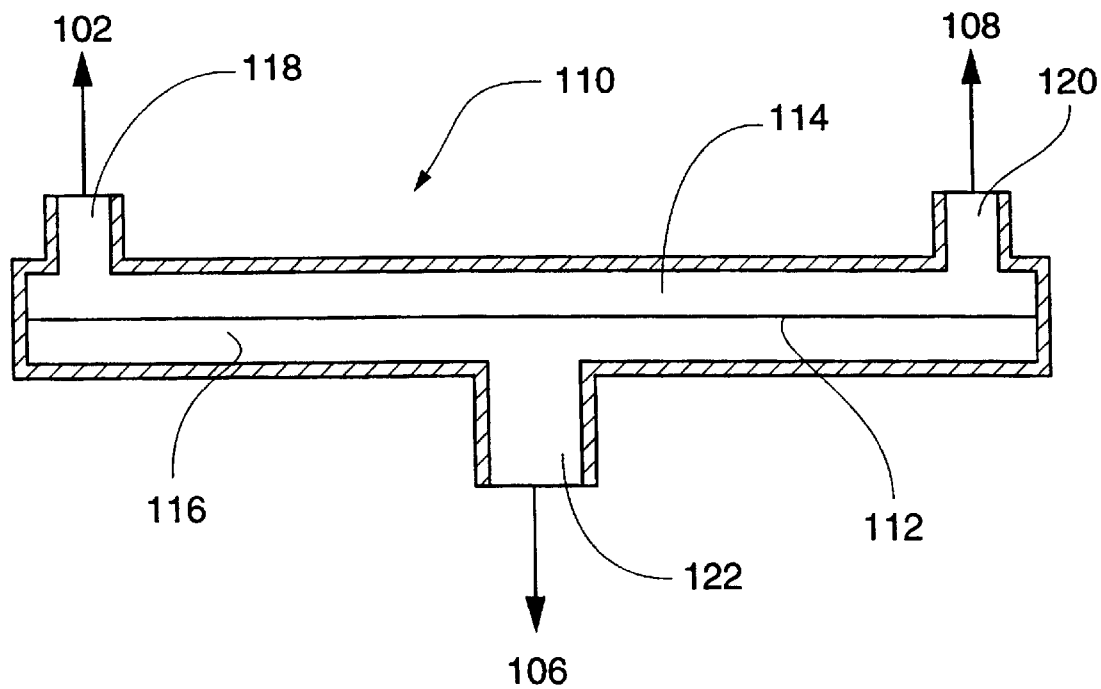
FIG. 2 is a sectional view of section one configuration of a membrane separation unit of the present invention.

The membrane separation step 104 may be performed in any suitable membrane separation unit. Referring to FIG. 2, one configuration for a membrane separation unit 110 is shown. The membrane separation unit 110 includes a membrane 112 positioned between and separating a first fluid chamber 114 that is adjacent a first side of the membrane 112 and a second fluid chamber 116 that is adjacent a second side of the membrane 112. The membrane separation unit 110 also includes a first fluid port 118 and a second fluid port 120 that are both in fluid communication with the first fluid chamber 114. A third fluid port 122 is in fluid communication with the second fluid chamber 116.

With continued reference to FIG. 2, when the membrane separation unit 110 is in operation, the feed fluid 102 enters into the first fluid chamber 114 through the first fluid port 118. The feed fluid 102 contacts the membrane 112 and a portion of the feed fluid passes through the membrane and into the second fluid chamber 116 and is removed as the permeate fluid 106 through the third fluid port 122. That portion of the feed fluid 102 that does not pass through the membrane 112 is removed through the second fluid port 120 as the retentate fluid 108.

As noted previously, the membrane 112 includes a polymer matrix having a plurality of a first chemical group corresponding with ion exchange sites and a plurality of a second chemical group that modifies the electronic environment of the ion exchange sites. In a preferred class of membranes, the polymer matrix includes two different polymers. The first polymer is an ion exchange polymer having the first chemical group corresponding with ion exchange sites. The second polymer includes the second chemical group, such that the second chemical group of the second polymer interacts with the first polymer to modify the electronic environment of the ion exchange sites.

As previously noted, the first chemical group is typically a negatively charged, or anionic, group and the ion exchange sites are, therefore, available for cationic exchange. The first chemical group may be any negatively charged group, including sulfonate, carboxylate or phosphonate groups. One preferred class of polymers for the first polymer are perfluorosulfonic acid polymers. A class of perfluorosulfonic acid polymers useful with the present invention are sold by DuPont under the trade name Nafion™. Other polymers that may be used as the first polymer include poly(sulfonated styrene) and poly(vinylsulfonic acid).

Figure 10:
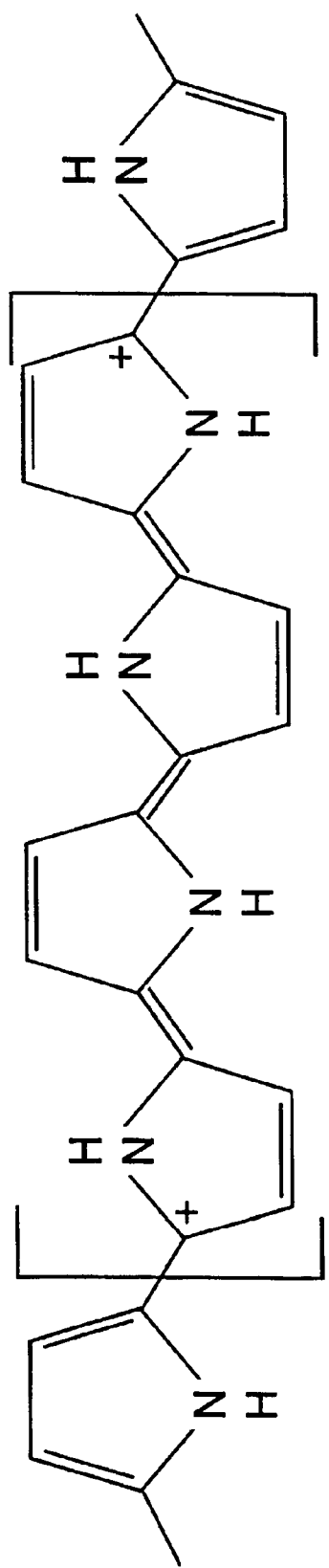
FIG. 10 shows a chemical structure of oxidized poly (pyrrole).

Also as noted previously, the second chemical group is typically positively charged, or cationic. One example of a second polymer having such a positively charged group is oxidized poly(pyrrole). A chemical structure for oxidized poly(pyrrole) is shown in FIG. 10. Other possible second polymers including positively charged groups are polyanilines, derivatives of polyanilines, and derivatives of poly(pyrrole), such as poly(N-methyl pyrrole). Furthermore, the second polymer is preferably an electrically conductive polymer. Oxidized poly(pyrrole) is electrically conductive. Other electrically conductive polymers that may be used with the present invention include polyethylene oxide and polypropylene oxide.

The membrane 112 also contains ionic carriers, typically cationic carriers, that facilitate transport of the first component across the membrane 112 to separate the first component from the second component. Examples of cations useful as carriers in the membrane include cations of silver (Ag+) and cations of any of nickel, iron, copper, rhodium and cobalt (e.g., $Ni^{2+}$, $Fe^{2+}$, $Cu^+$, $Rh^{3+}$, $Co^{2+}$) and any protonated diamines. Silver(I) cations are particularly well suited for separation of an alkene as the first component from an alkane as the second component, although cations of nickel, iron, copper and rhodium are also useful. As used herein, alkene refers to any olefinic compound, whether mono- or polyunsaturated. For separation of acetylene as the first component, cations of nickel, iron, copper and rhodium are useful. Cations of silver, nickel, iron, copper and rhodium are useful when an oxide of nitrogen or an oxide of sulfur is the first component. Protonated diamines are useful when carbon dioxide or hydrogen sulfide is the first component. Cations of copper are useful when carbon monoxide is the first component. Cations of cobalt are useful when oxygen is the first component. For most unsaturated organic compounds, $Ag^+$ is the preferred cation, except for alkynes, which can react violently in the presence of $Ag^+$.

A further desirable feature of the membrane 112 is that the membrane should be thin to permit rapid movement of the first component through the membrane 112. In that regard, the membrane 112 should preferably have a thickness of smaller than about 15 microns, more preferably smaller than about 10 microns, and most preferably smaller than about 6 microns in width. The membrane 112 is considerably thinner than commercially available Nafion ™polymers, which typically have a thickness of 100 microns or greater. Nafion™ polymers are also available, however, in solution form, which may be used to prepare films of varying thickness as may be required by the present invention. It should be noted that as the membrane 112 becomes thinner, the permeation rate tends to increase, but the separation factor of the first component to the second component tends to decrease. Therefore, the membrane should not be thinner than about 2 microns and preferably not thinner than about 3 microns. Membranes having a thickness of from about 4 microns to about 10 microns are best for most applications.

With continued reference to FIGS. 1 and 2, the feed fluid 102 is a fluid mixture including both the first component and the second component. The feed fluid 102 may be in a gas or liquid phase. In addition to the first component and the second component, the feed fluid 102 may also include other components that do not detrimentally interfere with separation of the first component and the second component.

The first component and the second component in the feed fluid 102 have different electronic characteristics which accounts for their different abilities to travel through the membrane 112. In that regard, the first component has a greater affinity for complexation with the carrier ions in the membrane 112 than does the second component. Typically, the first component is less electrophilic than the second component. Often, the first component is more polar than the second component. When the first component and the second component are both organic materials, the first component is typically unsaturated to a greater degree than the second component. Examples of first component/second component pairs of organic compounds that may be suitable for separation according to the present invention include: alkenes/alkanes (e.g., ethylene/ethane, propylene/propane, butylene/butane, pentene/pentane, etc.), alpha-olefins/beta-olefins, dialkenes/monoalkenes, alkynes/alkenes or alkanes (e.g., acetylene/ethylene or ethane) and styrene monomer/ethyl benzene. Further mnore, one or both of the first component and the second component may be aromatic. One example when both the first component and the second component are aromatic is when the first component is a styrene monomer and the second component is ethyl benzene. Other separations according to the present invention include oxygen as the first component being separated from other components in air, acid gases (carbon dioxide and/or hydrogen sulfide) as the first component being separated from other components of natural gas or petroleum gas, oxides of nitrogen and/or oxides of sulfur as the first component being separated from other components of flue gas, and carbon monoxide as the first component being separated from a variety of gas mixtures. Furthermore, many separations that are currently performed with conventional processes of chemical absorption and solvent extraction lend themselves to the membrane separation method of the present invention.

Although the discussion herein is presented in terms of separating a first component from a second component, it should be recognized that the present invention may be used to simultaneously separate a number of components from a fluid mixture, with any one of the separated components being the first component referred to herein. For example, a number of different alkenes could simultaneously be separated from alkanes in a fluid mixture.

The operating conditions during the membrane separation step 104 will vary depending upon the specific materials involved with the separation. Different conditions of temperature and pressure will be suitable for different separations. Furthermore, the membrane separation step may be performed with a humidified feed fluid 102 or with a feed fluid 102 that is substantially free of water. This is in sharp contrast to previously proposed membrane separation systems that require the presence of water to maintain the polymer of the membrane in a swollen form.

With continued reference to FIGS. 1 and 2, the permeate fluid 106 is enriched in the first component and depleted in the second component relative to the feed fluid 102. Likewise, the retentate fluid 108 is depleted in the first component and enriched in the second component relative to the feed fluid 102. As mentioned previously, however, the feed fluid 102, the permeate fluid 106 and retentate fluid 108 may each be in either a gas or liquid phase. As used herein, a gas phase includes both true gases, being materials that are gaseous under normal conditions, and also materials that are normally liquid or solid but are maintained in a vapor state for processing. For many applications, the feed fluid 102 will be liquid phase and the permeate fluid 106 will be gas phase. This circumstance is often referred to as pervaporation. For other applications, the feed fluid 102 and the permeate fluid 106 may both be liquid phase. This circumstance is often referred to as perstraction. This would be the case, for example, when a sweep liquid, such as isooctane, is used to dissolve an alkene in the permeate fluid 106.

Figure 3:
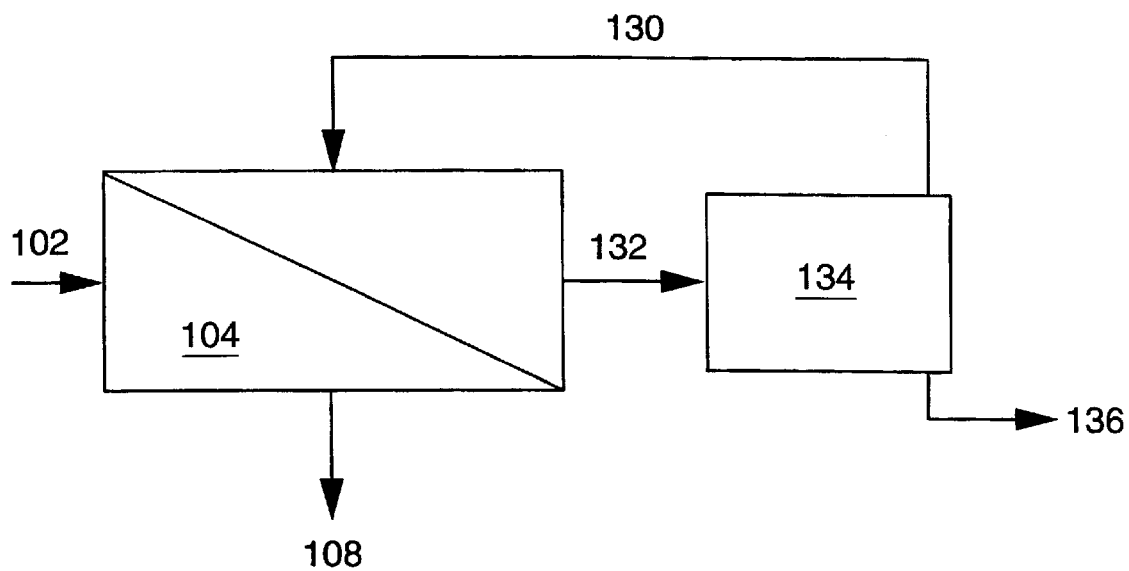
FIG. 3 is a process block diagram showing an embodiment of the membrane separation method of the present invention that includes the use of a sweep fluid.

The feed fluid 102 may include the first component and the second component dissolved in or diluted by a solvent or other carrier fluid. Likewise, removal of the permeate fluid 106 could be assisted through the use of a sweep fluid, either gaseous or liquid, depending upon the circumstances. Any such solvent or diluent in the feed fluid 102 or sweep fluid used to remove the permeate fluid 106 should be selected so that the material is easily separable from other components of the system. In particular, it is important that any sweep fluid be easily separable from the first component in the permeate fluid 106. One embodiment of the process of the present invention utilizing a sweep fluid is shown in FIG. 3. As shown in FIG. 3, a sweep fluid 130 is fed to the membrane separation step 104 to mix with and assist in removing the permeate fluid 106 (not shown in FIG. 3) to form a diluted permeate 132 including the permeate fluid 106 and the sweep fluid 130. The diluted permeate 132 is fed to a sweep fluid recovery step 134 where the sweep fluid 130 is separated to form a permeate product 136. The sweep fluid 130 is then recycled back to the membrane separation step 104.

Figure 4:
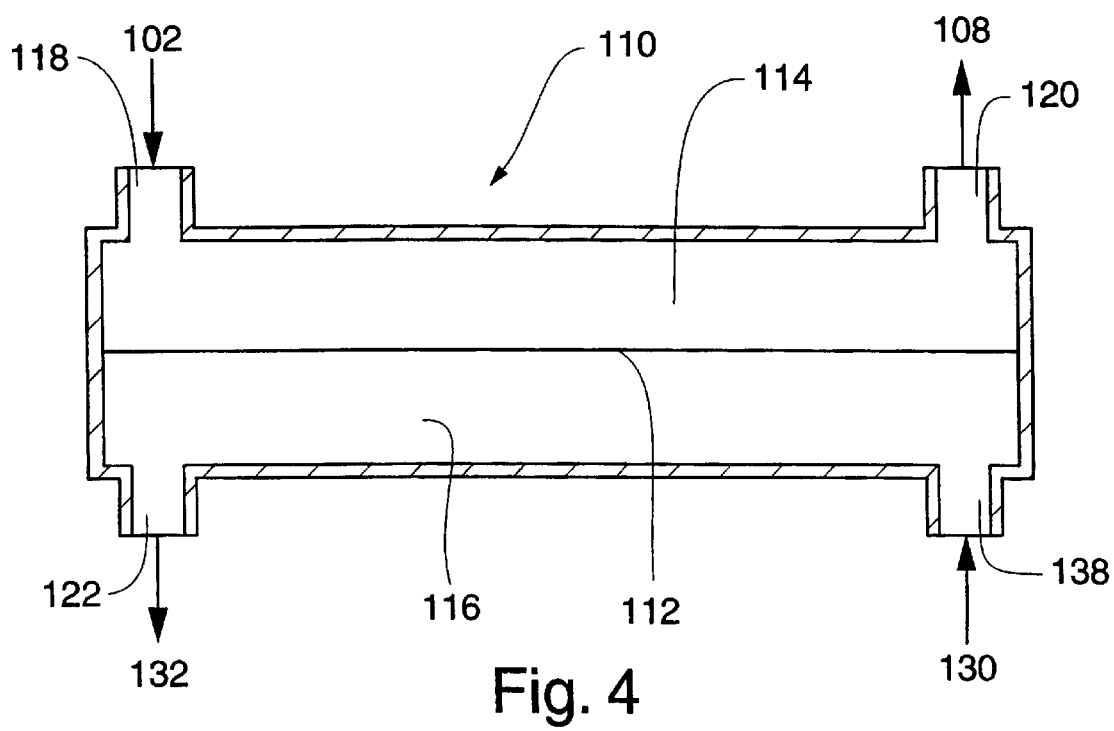
FIG. 4 is a sectional view of one configuration of a membrane separation unit of the present invention for accommodating the use of a sweep gas.

Referring now to FIG. 4, a typical configuration is shown for the membrane separation unit 110 to permit the use of the sweep gas 130. As shown in FIG. 4, the membrane separation unit 110 includes a fourth fluid port 138 through which the sweep fluid 130 is introduced into the second fluid chamber 116 during operation. The diluted permeate 132 is removed via the third fluid port 122 during operation.

The membrane separation method of the present invention is particularly well suited for separating components that are often difficult to separate by conventional physical separation methods due to the similar physical properties of the first and second components. This is especially true when separating a more saturated hydrocarbon from an analogous, but less saturated hydrocarbon, because the two components often have boiling points, melting points, crystallization properties or other properties that are similar, complicating separation. For example, traditional distillation separations of ethylene from ethane, propylene from propane, butylene from butane, and styrene monomer from ethyl benzene are energy intensive and require tall distillation towers to effect the separation due to the close proximity of boiling points of the components being separated.

The membrane separation method of the present invention may be used alone, as described above, to separate the first component from the second component. Also, several membrane separation steps may be combined in series to increase the degree of separation. In that regard, the membrane separation of the present invention could replace existing separation processes for many separations. Alternatively, however, it is possible to combine the membrane separation method of the present invention with other separation methods to form hybrid separation processes. For example, the membrane separation method of the present invention could be combined with distillation in a variety of process configurations to lighten the load on a distillation unit and reduce energy requirements.

Referring now to FIGS. 5, 6, and 7, three embodiments are shown of a hybrid separation process involving a membrane separation step 104 in combination with a distillation step 140. As shown in FIG. 5, a process feed 141 is initially treated in the membrane separation step 104 to remove a significant quantity of the second component prior to the distillation step 140. Distillation bottoms 142 are recycled to upstream of the membrane separation step 104 while the desired product, enriched in the first component, is withdrawn as distillation overhead 144. In FIG. 6, the membrane separation step 104 is used to treat the distillation overhead 144 with the retentate fluid 108 from the membrane separation step 104 being returned to the distillation step 140, while the permeate fluid 106 includes the desired product enriched in the first component. In FIG. 7, the membrane separation step 104 treats the distillation bottoms 142. The permeate fluid 106 is recycled to the distillation step 140 and the distillation overhead 144 includes the desired product enriched in the first component. It should be noted that hybrid systems with other separation processes could also be devised, including hybrids with cryogenic and crystallization processes.

The membranes of the present invention may be prepared in a variety of manners. In a preferred method of manufacture, however, a film is first provided having the first polymer in a protonated form, but not having the second polymer. The film with the first polymer is then contacted with a monomer for preparing the second polymer, and the monomer is polymerized in the presence of the film to form a composite film having both the second polymer and the first polymer. The membrane is then completed by replacing protons at the ion exchange sites with the desired cationic carriers for facilitating transport of the first component through the membrane.

The film containing the first polymer should generally have a thickness of smaller than about 15 microns, preferably smaller than about 10 microns and more preferably smaller than about 6 microns. Such a film may be made by any known technique. For example, a Nafion™ film may be made from a Nafion™-containing solution by evaporating the solvent to form a Nafion™ film.

Polymerizing the monomer in the presence of the first polymer may be accomplished by immersing the film in a solution containing the monomer for the second polymer. Polymerization may then be initiated in the solution so that the second polymer will be formed in the presence of the first polymer.

Following preparation of the second polymer, the resulting composite film may be rinsed with water and allowed to dry prior to finishing the membrane by loading it with the desired cationic carrier for facilitated transport of the first component during membrane separation. Loading the composite film with the cationic carrier is typically accomplished by immersing the composite film in a solution containing the desired cation.

EXAMPLES

The invention will now be further described by the following examples, which are provided for illustration purposes only and are in no way intended to limit the scope of the present invention.

Example 1

This example demonstrates the manufacture of a silver(I) form Nafion™-poly(pyrrole) membrane. A film of Nafion™ is prepared on a glass plate by evaporation of a solvent from a 5 weight percent solution of Nafion™ EW1100 (from Aldrich) in a mixture of lower aliphatic alcohols and water. The resulting film is redissolved in a mixture of equal volumes of 1-propanol and ethanol using an ultrasonic bath. The solution is then cast on a clean glass plate and the solvent is allowed to evaporate at room temperature. A clear film results and is annealed at 200° C. for three hours and then allowed to slowly cool to room temperature. The film is removed from the glass plate by immersion in water at room temperature. The Nafion™ film is then immersed in a solution containing 0.012 pyrrole and 0.0073M hydrogen peroxide for about ten minutes. A deep green-black film of Nafion™-poly(pyrrole) composite is obtained. The composite film is rinsed with water and allowed to dry at room temperature. The composite film is a proton-form of the desired membrane. To complete the membrane, the composite film is immersed in a 1M silver nitrate solution for six hours. By gravametric analysis, the composite film is found to consist of about 2 weight percent poly(pyrrole) and about 7 weight percent silver. The composite film is allowed to dry at room temperature. The procedure is repeated to prepare membranes of thicknesses of about 5 microns, 6 microns and 9 microns.

Example 2

This example demonstrates use of membranes of the present invention to separate ethylene from ethane.

The silver(I)-form Nafion™-poly(pyrrole) composite membranes made according to Example 1 are mounted in a membrane cell configured for cross-flow in the separation of ethane from a binary feed mixture of between 40 to 60 mole percent ethylene and 60 to 40 mole percent ethane. Helium is used as a sweep gas to remove permeate fluid from the permeate side of the membrane cell. Feed and sweep pressures are controlled by back pressure regulators. Total pressure on the feed side is varied from about 1 atmosphere to about 2.5 atmospheres while the total pressure on the sweep side is maintained at a level of about 1 atmosphere. Permeate and retentate fluids from the membrane cell are analyzed by gas chromatography with a thermal conductivity detector.

Figure 8:
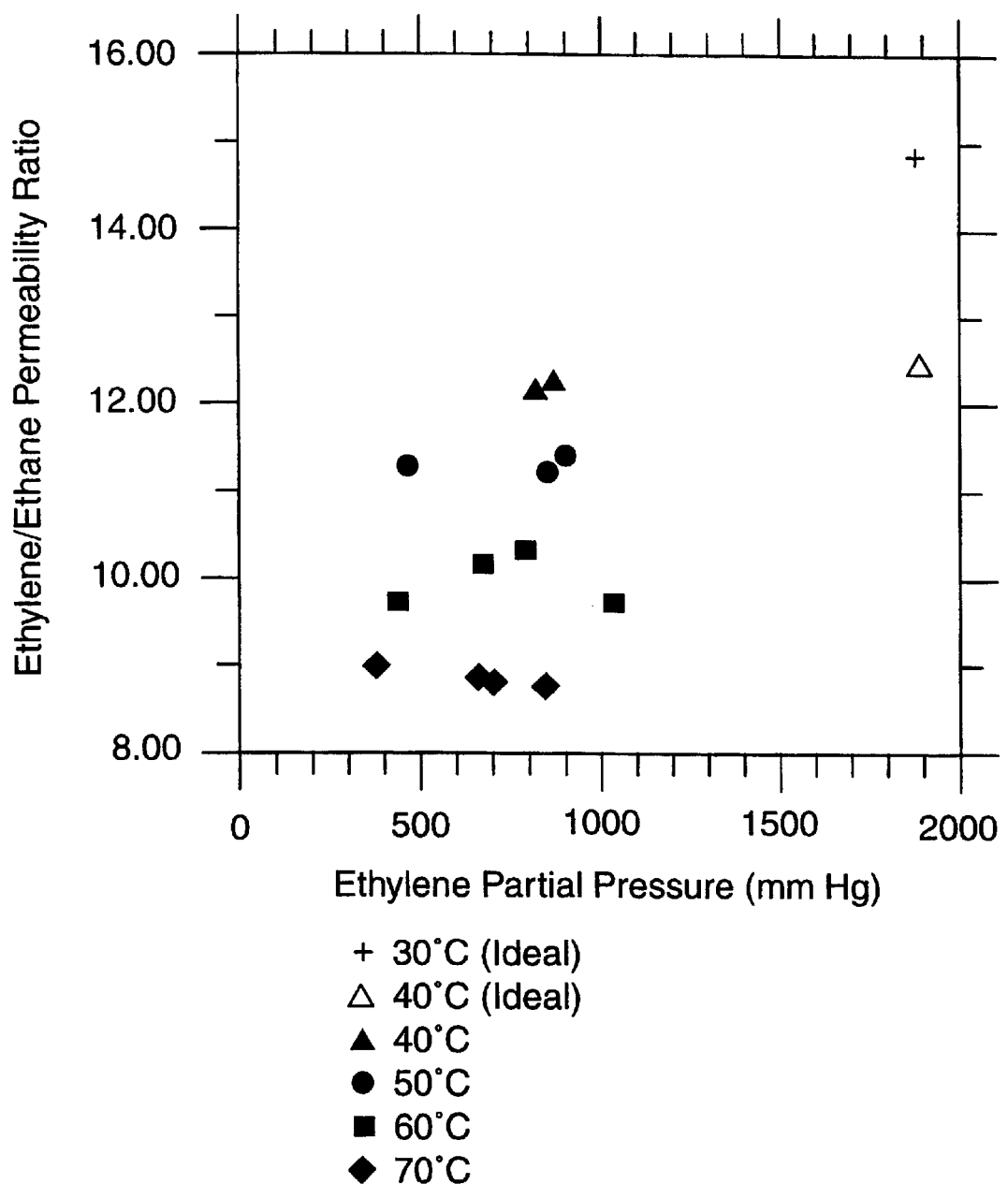
FIG. 8 is a plot of ethylene/ethane permeability ratios as a function of ethylene partial pressure at various temperatures relating to Example 2.

FIG. 8 shows a plot of ethylene/ethane permeability ratios, or separation factors, versus ethylene partial pressure for tests of a 6 micron membrane at several temperatures. Ideal permeability ratios, or separation factors, obtained from pure gas permeability measurements are also shown in FIG. 8. As seen in FIG. 8, permeability ratios increase with lower operating temperature, but remain relatively large even at temperatures as high as 70° C.

Figure 9:
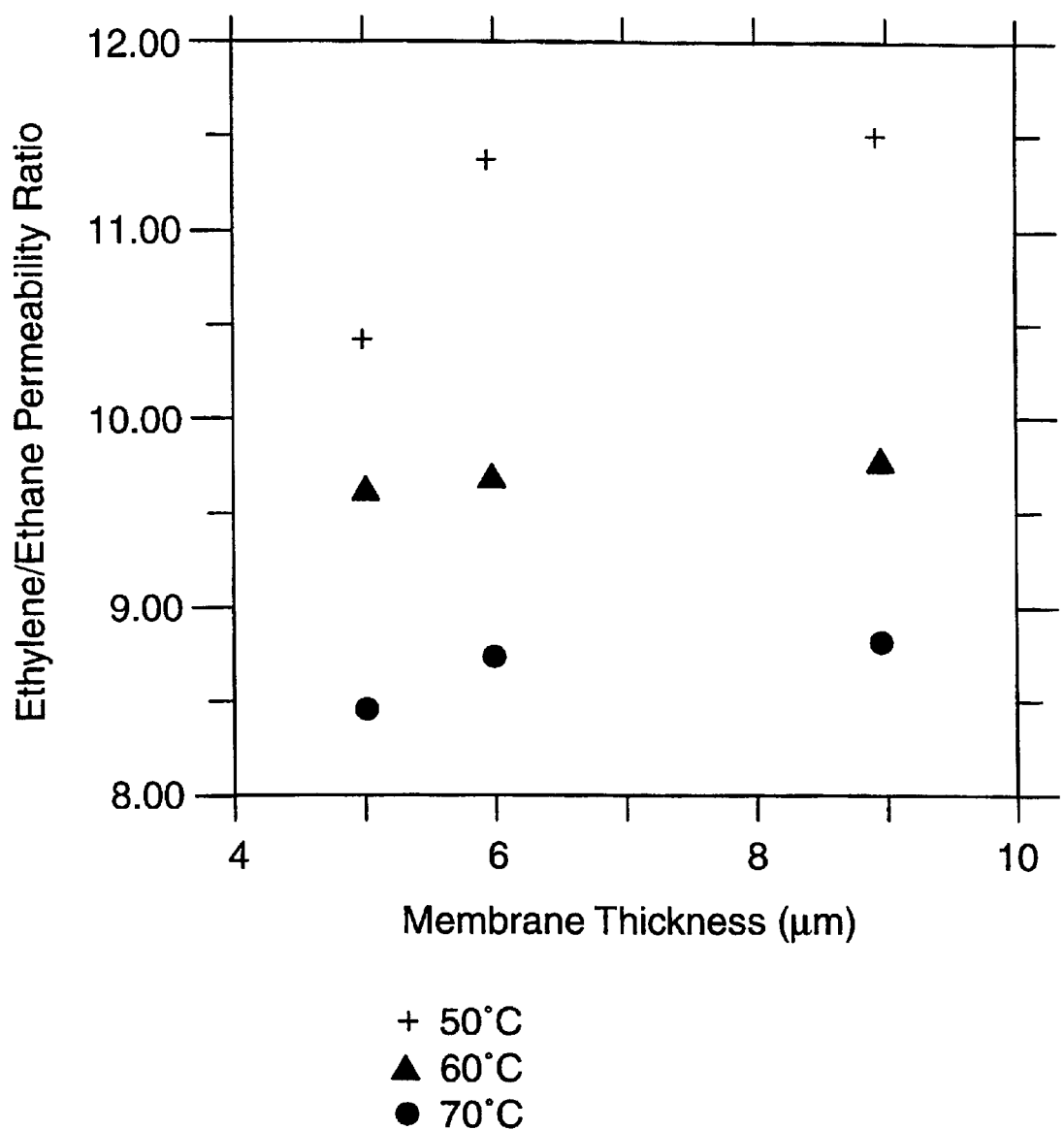
FIG. 9 is a plot of ethylene/ethane permeability ratios as a function of membrane thickness at various temperatures relating to Example 2.

FIG. 9 shows ethylene/ethane permeability ratios as a function of membrane thickness at various temperatures for tests performed at a total feed pressure of 2.5 atmospheres with a feed mixture of 50 mole percent ethylene and 50 mole percent ethane.

It should be noted that the large separation factors shown in FIGS. 8 and 9 for separation of ethylene from ethane are achieved even without humidifying the feed and sweep streams to maintain the membrane in a water-swollen state. Although humidification of these streams is not detrimental to separation performance, it is a significant advantage of the present invention that humidification is not required.

Example 3

This example demonstrates differences in complexation capabilities between a dry silver(I)-form Nafion™-poly(pyrrole) membrane and a dry silver(I)-form Nafion™ membrane.

FTIR spectroscopy measurements of membranes are carried out using a Bio-Rad FTS-40 FTIR spectrometer equipped with a liquid-nitrogen cooled, narrow-banded-pass mercury cadmium telluride (MCT) detector. The spectra are collected in absorbance mode using 128 scans at a resolution of 2 $cm^{-1}$. The stainless steel chamber was used in conjunction with a Harrick Scientific Praying Mantis Diffuse Reflection Attachment (DRA). The window material of the dome is zinc sulfide. Membranes to be tested are placed on potassium bromide power to increase collected radiation from the membranes being tested. The temperature of the sample cup, filled with potassium bromide, is held at a temperature of 30° C. for each measurement. Prior to introducing ethylene into the sample cup, spectra of the films in the absence of ethylene are collected as background measurements. Ethylene pressure in the sample cup is maintained at about 3700 mm Hg.

An ethylene molecule has a carbon-to-carbon double bond stretching frequency of 1623 $cm^{-1}$, which is infrared inactive. When an ethylene molecule coordinates with a silver(I) ion, the carbon-to-carbon double bond vibrational mode becomes observable in the infrared range due to the change in symmetry of the ethylene molecule, resulting from a shift of the double bond stretching vibration to a lower frequency.

The three membranes are exposed to ethylene and evaluated by FTIR spectroscopy. An infrared absorption band at 1542.77 $cm^{-1}$ was observed with the silver(I)-form Nafion™-poly(pyrrole) composite film. This absorption band is absent in both the proton-form Nafion™ membrane or in a dry silver(I)-form Nafion™ film. The proton-form film is tested to verify that this absorption band is not due to the interaction between the polymers of the film and ethylene. The presence of the absorption band for the dry silver (I)-form Nafion TMpoly(pyrrole) film suggests that ethylene molecules have relatively strong interaction with silver(I) ions in that film. The absence of the absorption band with the silver(I)-form Nafion™ film indicates that, in the absence of water, the silver(I) ions in the Nafion™ membrane are not capable of complexing with ethylene. The results indicate that the presence of the poly(pyrrole) polymer in the membrane significantly modifies the electronic environment of the silver(I) ion to permit complexation with ethylene, even in the absence of water.

It should be recognized that any feature of any embodiment of the present invention disclosed herein can be combined with any other feature of any other embodiment in any combination. Also, while various embodiments of the present invention have been described in detail, it is apparent that modifications and adaptations of those embodiments will occur to those skilled in the art. It is to be expressly understood, however, that such modifications and adaptations are intended to be within the scope of the present invention, to the extent permitted by the prior art.

What is claimed is:

1. A method for separating a component from a fluid mixture, the method comprising the steps of:

providing a feed fluid comprising a first organic component and a second organic component that is different from said first component;

introducing said feed fluid into a membrane separation unit where said feed fluid contacts a membrane;

separating, in said membrane separation unit, said feed fluid into a permeate portion and a retentate portion, said permeate portion being a portion of said feed fluid passing through said membrane during said separating and said retentate portion being a portion of said feed fluid not passing through said membrane during said separating, said permeate portion being enriched in said first component and depleted in said second component relative to said feed fluid and said retentate portion being depleted in said first component and enriched in said second component relative to said feed fluid;

removing said retentate portion and said permeate portion from said membrane separation unit;

wherein, said membrane comprises a polymeric matrix having first chemical groups, being ionic, at ion exchange sites of said polymer matrix and second chemical groups that modify the electronic environment of said ion exchange sites.

2. The method of claim 1, wherein:

said polymeric matrix comprises a first polymer and a second polymer, said first polymer comprising said first chemical group and said second polymer comprising said second chemical group.

3. The method of claim 2, wherein:

said step of separating comprises perstraction, wherein said feed fluid and said permeate portion are both liquid phase.

4. The method of claim 2, wherein:

said step of separating comprises pervaporation, wherein said feed fluid is liquid phase and said permeate is gas phase.

5. The subject matter of claim 2, wherein:

said first component comprises an unsaturated organic compound and said second component has a higher degree of saturation than said first component.

6. The subject matter of claim 2, wherein:

said first component comprises an alkene.

7. The subject matter of claim 2, wherein:

said first component comprises at least one of ethylene and propylene and said second component comprises at least one of ethane and propane.

8. The subject matter of claim 2, wherein:

said first component comprises an alkyne.

9. The subject matter of claim 2, wherein:

said first component comprises acetylene.

10. The subject matter of claim 2, wherein:

said first component comprises styrene monomer and said second component comprises ethyl benzene.

11. The subject matter of claim 2, wherein:

said first polymer comprises a negatively charged group and said second polymer comprises a positively charged group.

12. The subject matter of claim 2, wherein:

said first polymer comprises at least one of poly (sulfonated styrene) and poly(vinylsulfonic acid).

13. The subject matter of claim 2, wherein:

said first polymer comprises a plurality of a sulfonate group.

14. The subject matter of claim 2, wherein:

said first polymer comprises a perfluorosulfonic acid polymer.

15. The subject matter of claim 2, wherein:

said first polymer comprises a Nafion™ polymer.

16. The subject matter of claim 2, wherein:

said second polymer comprises oxidized poly(pyrrole).

17. The subject matter of claim 2, wherein:

said second polymer comprises at least one of polyethylene oxide and polypropylene oxide.

18. The subject matter of claim 2, wherein:

said first component and said second component are each a hydrocarbon.

19. The subject matter of claim 2, wherein:

said second component is a hydrocarbon and said first component is a hydrocarbon being analogous to said second component and being less saturated than said second component.

20. The subject matter of claim 2, wherein:

said first component comprises an unsaturated organic compound and said second component comprises a saturated organic compound.

21. The subject matter of claim 2, wherein:

said first component comprises an alkyne or an alkene and said second component comprises an alkene or an alkane.

22. The method of claim 1, wherein:

said first chemical group has a negative charge and said second chemical group has a positive charge.

23. The method of claim 3, wherein:

said positive charge of said second chemical group at least partially offsets a portion of said negative charge of said first group, whereby the strength of bonding at said ion exchange site between said first group and a carrier ion is reduced, permitting increased mobility of said carrier ion and thereby facilitating transport of said first component through said membrane.

24. A method for separating a component from a fluid mixture, the method comprising the steps of:

providing a feed fluid comprising a first organic component and a second organic component that is different from said first component;

introducing said feed fluid into a membrane separation unit where said feed fluid contacts a membrane;

separating, in said membrane separation unit, said feed fluid into a permeate portion and a retentate portion, said permeate portion being a portion of said feed fluid passing through said membrane during said separating and said retentate portion being a portion of said feed fluid not passing through said membrane during said separating, said permeate portion being enriched in said first component and depleted in said second component relative to said feed fluid and said retentate portion being depleted in said first component and enriched in said second component relative to said feed fluid;

removing said retentate portion and said permeate portion from said membrane separation unit;

wherein, said membrane comprises a first polymer, being an ion exchange polymer having ion exchange sites, and a second polymer interacting with said first polymer to modify the electronic environment of said ion exchange sites.

25. A method for separating a component from a fluid mixture, the method comprising the steps of:

providing a feed fluid comprising a first organic component and a second organic component that is different from said first component;

introducing said feed fluid into a membrane separation unit where said feed fluid contacts a membrane;

separating, in said membrane separation unit, said feed fluid into a permeate portion and a retentate portion, said permeate portion being a portion of said feed fluid passing through said membrane during said separating and said retentate portion being a portion of said feed fluid not passing through said membrane during said separating, said permeate portion being enriched in said first component and depleted in said second component relative to said feed fluid and said retentate portion being depleted in said first component and enriched in said second component relative to said feed fluid;

removing said retentate portion and said permeate portion from said membrane separation unit;

wherein, said membrane comprises a first polymer, being an ion exchange polymer having ion exchange sites, and a second polymer, being an electrically conductive polymer.

* * * * *